3,351,071
CARBON FILTER MATERIAL AND PROCESS FOR PREPARING IT

Alan M. Belfort, Devon, Pa., assignor to FMC Corporation, Philadelphia, Pa., a corporation of Delaware
No Drawing. Filed Dec. 23, 1964, Ser. No. 420,815
3 Claims. (Cl. 131—265)

ABSTRACT OF THE DISCLOSURE

A filter material for cigarettes, fluids and the like which comprises a small shaped particle containing cellulose crystallite aggregates and active carbon.

---

Active carbon granules are presently used as filter aids in cigarettes. The dusting of this form of carbon and difficulties of handling irregular sizes and shapes of these granules are problems. Active carbon produced in the form of cylindrical plugs have poor draw and offer high resistance to smoke flow. Combination active carbon granule-fibrous filter elements remove most of the tobacco smoke flavor and result in a tasteless smoke.

Active carbon particles can be bound together with various binding agents but, in the process, often lose much of their ability to filter.

It is an objective of this invention to provide low-dusting, particulate forms of active carbon preferably of spherical shape and uniform size.

It is a further object of this invention to provide active carbon-containing spherical particles which have improved filterability.

It is a further object of this invention to provide active carbon-containing spherical particles to which a tobacco flavor has been added.

These and other objects are accomplished in accordance with this invention which is an article of manufacture comprising a shaped particle of a homogeneous mixture of from 5 to 95% by weight of cellulose crystallite aggregate having a particle size ranging from about 0.1 to 375 microns and from 95 to 5% by weight of active carbon powder having a particle size ranging from 1 to 65 microns, said shaped particle having an average diameter ranging from about 0.1 to 25 mm.

It is preferred, in order to produce shaped particles having both high strength and high carbon content that the cellulose crystallite aggregates be present in the particle in an amount ranging from about 10 to 90% by weight with amounts of carbon ranging from 90 to 10%. The preferred particle size for the cellulose crystallite aggregates ranges from about 0.1 to 150 microns while the preferred particles size for the carbon ranges from 3 to 20 microns.

This invention also includes a method of preparing shaped carbon containing particles which comprises forming a mixture of from 5 to 95 parts by weight of cellulose crystallite aggregates having a particle size ranging from about 0.1 up to 375 microns, from 95 to 5 parts by weight of carbon particles ranging in size from 1 to 65 microns and from 100 to 200% of an aqueous liquid based on the weight of the solids content of the mixture, forming the mixture into shaped particles having an average diameter when dry of from 0.1 to 25 mm., and evaporating the liquid from the particles.

The cellulose crystallite aggregates are products obtained by the controlled hydrolysis of cellulose, there being formed an acid-soluble portion and an acid-insoluble portion. The latter comprises a crystalline residue or remainder which is washed and recovered, being referred to as cellulose crystallite aggregates, or as level-off D.P. cellulose.

In the hydrolysis of cellulose, the amorphous portions of the original cellulose chains are dissolved, the undissolved portions being in a particulate, non-fibrous or crystalline form as a result of the disruption of the continuity of the fine structures between crystalline and amorphous regions of the original cellulose. Although hydrolysis may be effected by various specific methods, including the use of various alkaline reagents, acids and enzymes, a direct method which is free of secondary reactions comprises the treatment of the original cellulosic material with 2.5 normal hydrochloric acid solution for 15 minutes at boiling temperature. Another suitable method comprises treating the cellulosic material with 0.5% hydrochloric acid solution (0.14 normal) at 250° F. for 1 hour. The cellulose undergoing such treatment reaches, within the time period noted, a substantially constant molecular weight, or in other words, the number of repeating units or monomers, sometimes designated anhydroglucose units, which make up the cellulosic material, becomes relatively constant, from which it is apparent that the degree of polymerization of the material has leveled off, hence the name level-off D.P. cellulose. In other words, if the hydrolysis reaction were continued beyond the period noted, the D.P. would change very little if at all. In all cases, the level-off D.P. value reflects the fact that destruction of the fibrous structure has occurred as a result of the substantially complete removal of the amorphous regions of the original cellulose.

The cellulose crystallite aggregates, or level-off D.P. cellulose, in accordance with the present invention have average level-off degrees of polymerization ranging from 15 to 375 and preferably from 30 to 300 anhydroglucose units. The degree of polymerization or D.P. is measured and determined by the procedure set forth in "Fundamentals of High Polymers" by O. A. Battista, Reinhold Publishing Corp., New York City, 1958, pp. 74 through 80, 106 and 107.

The aggregates resulting from the hydrolysis and washing steps are further characterized by having a particle size in the range of 1 or 2 up to about 375 microns, as determined visibly by microscopic examination. If desired, the foregoing product may be subjected to a mechanical disintegration, and there is produced a material, the bulk of which has a particle size in the range of about 0.1 to about 150 microns.

The source material for the crystallite aggregates may suitably be one or more natural fibers such as ramie, cotton, purified cotton, also bleached sulfite pulp, bleached sulfate wood pulp, regenerated cellulose, etc. Particularly suitable are sulfite pulp which has an average level-off D.P. of 200 to 300, at least 90% if which has a D.P. in the range of 75 to 550; and also sulfate pulp which has an average level-off D.P. of 125 to 175, at least 90% of which is in the range of 50 to 350. Other suitable cellulose crystallite aggregates may have lower average level-off D.P. values, say in the range of 60 to 125, or even 15 to 60. In general, the cellulosic source material has a D.P. greater than the level-off D.P. thereof.

Mechanical disintegration of the aggregates, as referred to above, may be carried out in several ways, as by subjecting them to attrition in a mill, or to a high speed cutting action, or to the action of high pressures on the order of at least 5,000 or 10,000 p.s.i. The disintegration of the aggregates is carried out in the presence of a liquid medium, although where high pressure alone is employed, such medium, although desirable, is not necessary.

The active carbon which is used for this invention is preferably a highly activated, high carbon content material. However, in general, it may have varying physical characteristics including particle size, density, porosity, pore volume, iodine number, phenol number, and molasses number, so as to provide any desired gas or liquid adsorption properties. The particles size of the carbon is not critical and will depend in part on the desired average diameter of the shaped particles to be manufactured. Beneficially, the carbon is of a small particle size ranging from about one micron to 65 microns.

In general, the particles of this invention are shaped by mixing the ingredients in a balling mill, or mixing vessel wherein the mixing paddles conform substantially to the shape of the side of the vessel. Sufficient water or other liquid is introduced with the dry mixture to produce a paste and the beaters or paddles are set for the desired size of the balls or spheres. Spheres of different sizes can be produced by varying the spacing between the beaters and the wall of the mixing vessel. At first the paste-like mixture is flattened out along the wall of the mixing vessel but eventually begins to form in the shape of small balls or spheres. Continued mixing converts virtually all of the mixture to uniform size spheres. After the spheres are formed they may be dried in air or in a dessicator to forms a free-flowing mass. Various balling apparatus are known which apply the same principle as decribed above for forming spheres.

Another machine used to make particles of generally spherical shape and uniform size was a tilted rotating pan, in which a wetted homogeneous mass of cellulose crystallite aggregates and carbon particles was made to form spherical particles by the so-called "snowballing" method.

Any type of apparatus capable of forming shaped particles of uniform size from homogeneous mixtures of the cellulose crystallite aggregates and carbon particles may be employed for this invention.

While water is a preferred liquid medium for aiding the formation of shaped particles of carbon and cellulose crystallites, other liquid media, including mixtures of water with polar or nonpolar liquids or combinations of the same, are useful. Examples of non-aqueous liquids are alcohols, hydrocarbons, ethers, esters, acids, ketones, aldehydes, amines or sulfoxides. Isopropyl alcohol and benzene are preferred non-aqueous liquids.

After the formation of the carbon-containing particles, it may be desirable, in some cases, to activate the product, as by steam treatment. By this method, carbon can be formed into particulate shapes and then activated with and in the presence of cellulose crystallite aggregates to provide materials of varying adsorption properties.

For the purpose of using the shaped particles of this invention as filter material for cigarettes one may add tobacco flavoring to the liquid with which the spheres are prepared or to the preformed spheres. Tobacco flavoring is generally available as an aqueous miscible dispersion of tobacco liquor or extract. The flavoring liquid may be added to the liquid for preparing the spheres or to the spheres themselves in amounts corresponding to a weight ratio of up to 1 part tobacco flavoring to 1 part dried spheres. However, it is preferred that much less tobacco flavoring be used to impregnate the carbon-containing spheres.

The following specific examples are set forth to demonstrate the manufacture of shaped particles of this invention:

*Example I*

500 grams of a mixture of 50 parts by weight of dry cellulose crystallite aggregates, having an average particle size of 38 microns, and 50 parts by weight of carbon powder, 90% having a particle size of less than 0.043 mm., and 750 cc. of water were introduced to a twenty quart planetary mixer. The blades of the mixer were set at about 2–5 mm. from the sides and bottom of the mixing bowl and then started to rotate at a speed of about 40 r.p.m. to form a wet cake and then at a speed of about 80 r.p.m. After about 30–60 minutes, spheres began to form as the water evaporated and, the mixing was continued until all of the mixture was converted to uniformly sized balls of 1 mm. in diameter. These spheres were then laid out to air dry. The dried spheres had the appearance of carbon, and had excellent low-dusting and free-flowing characteristics.

*Example II*

Spheres were produced in the manner of Example I except that the mixture of carbon and cellulose aggregates was changed to 60 parts by weight of carbon to 40 parts by weight of cellulose crystallite aggregates.

The dried spheres had the same excellent characteristics as those of Example I.

*Example III*

Spheres were prepared in the same manner as Example I except that the mixture of carbon and cellulose aggregates was changed to 70 parts by weight of carbon to 30 parts by weight of cellulose crystallite aggregates. These dried spheres also had the same excellent properties as those of Example I.

*Example IV*

An attempt was made to prepare spheres in a manner similar to that of Example I entirely with carbon particles. A wet cake of 100 grams of carbon powder as described in Example I and 100 grams of water was formed in a planetary mixer and mixed as in Example I. No spheres were formed and only carbon powder resulted as the water evaporated.

*Example V*

An attempt was made to prepare spheres in a manner similar to Example I with a mixture of clay and carbon particles. An amount of 100 grams of 50 parts of colloidal clay and 50 parts of carbon powder as described in Example I was made to a wet mass with 150 grams of water and processed as described in Example I. A dusting powder mixture resulted as the water was slowly allowed to evaporate.

*Example VI*

100 grams of the cellulose aggregate-charcoal spheres of Example I and 20 grams of a tobacco flavor liquid were mixed together in a beaker. The spheres readily absorbed the liquid tobacco flavor and become entirely free-flowing after standing for ½ hour.

Cellulose aggregate-carbon spheres of Example I were also mixed with other proportions of tobacco flavor liquid up to a ratio of 1 to 1 parts by weights. All of the samples became free-flowing either on standing or when dried in a dessicator.

Spheres having a ratio of 5 parts cellulose aggregate-carbon to 1 part tobacco flavor liquid were incorporated in a cigarette filter and found to improve taste without impeding draw.

*Example VII*

An amount of 100 grams of 50 parts of cellulose crystallite aggregates as described in Example I and 50 parts of carbon, 90% of which particles were less than 0.043 mm. in particle size, was poured into an aluminum pan having a 12 inch inside diameter and two inch depth, tilted at 45° from the horizontal, mounted on a central shaft, made to rotate at 60 r.p.m. and fitted with a wiper blade of Teflon shaped to scrape residue from the lower and side surfaces of the pan. Water was slowly sprayed on the mixture from an aspirator until, at about 45 percent solids level, the wet mass began to form balls which by the continual rolling, cascading motion became firm as the water was allowed to evaporate from their surfaces.

The product was non-dusting, spherical particles characterized by having a particle size distribution as follows:

| | Percent |
|---|---|
| Greater than 10 mesh (Tyler sieve scale) | 3 |
| 10 x 20 mesh | 14 |
| 20 x 48 mesh | 74 |
| Less than 48 mesh | 8 |

*Example VIII*

500 grams of dry powder containing 50 grams of cellulose crystallite aggregates as described in Example I and 450 grams of carbon, 90% of which particles were less than 0.043 mm. in diameter, was stirred in a 20 quart planetary mixer with water added slowly to make a wet cake containing 40% solids. The mixer was operated at a speed sufficient to form spheres which were air dried to produce balls varying slightly in size from 2 to 5 mm.

*Example IX*

The same procedure as in Example VIII was followed except that 100 grams of a mixture of 5 grams of cellulose crystallite aggregates and 95 grams of carbon particles was mixed in a Hobart mixer. Irregular shaped particles developed of sizes from 2 to 10 mm.

*Example X*

44 grams of cellulose crystallite aggregates of Example I, 44 grams of carbon as described in Example I and 88 grams of water were mixed in a 3 quart Hobart mixer to produce a wet cake. 60 grams of isopropyl alcohol were then added to the mass and mixing continued until spheres began to form. Mixing was continued until substantially all of the mixture was converted to shaped particles of uniform size. The sieve size of the air dried spheres averaged 10 x 20 mesh (Tyler scale).

Similar experiments were performed with ratios of cellulose crystallite aggregates to carbon of 1 to 2 and 1 to 9 with water to alcohol ratios of 1 to 2 and 4 to 3, respectively.

In these experiments all spheres were formed more rapidly than with the use of water alone because of the more rapid evaporation rate. All the spheres produced in this manner, i.e., using water-alcohol mixture, were non-dusting and hard.

*Example XI*

44 grams of cellulose crystallite aggregates as in Example I, 44 grams of carbon as in Example I and 88 grams of water were mixed together in a Hobart mixer to form a wet mass. 133 grams of benzene was added to this mixture with stirring. Stirring was continued to form spheres in from 30 to 60 minutes.

The product consisted of non-dusting, spherical particles having a particle size distribution as follows:

| | Percent |
|---|---|
| Greater than 10 mesh (Tyler sieve scale) | 4 |
| 10 x 20 mesh | 23 |
| 20 x 48 mesh | 72 |
| Less than 48 mesh | 1 |

Similar experiments were performed with ratios of cellulose crystallite aggregates to carbon of 1 to 3 and 1 to 9 with water to benzene ratios of 1 to 1 and 7 to 5, respectively. Non-dusting spheres were produced in each case in about one half the time it took using water alone as the liquid ingredient.

Various changes and modifications may be made practicing the invention without departing from the spirit and scope thereof and therefore, the invention is not to be limited except as defined in the appended claims.

I claim:

1. An article of manufacture comprising a shaped particle of a homogeneous mixture of from 5 to 95% by weight of cellulose crystallite aggregates having a particle size ranging from about 0.1 to 375 microns, and from 95 to 5% by weight of carbon having particle size ranging from about 1 to 65 microns, said shaped particle having an average diameter ranging from about 0.1 to 25 mm.

2. An article of manufacture comprising a shaped particle of a homogeneous mixture of from 10 to 90% by weight of cellulose crystallite aggregates having a particle size ranging from about 0.1 to 150 microns, and from 90 to 10% by weight of carbon having a particle size ranging from about 1 to 65 microns said shaped particle having an average diameter ranging from about 0.1 to 25 mm.

3. A free-flowing cigarette filter material comprising spheres of a homogeneous mixture from 5 to 95% of cellulose crystallite aggregates having a particle size ranging from about 0.1 to 375 microns from 95 to 5% by weight of carbon having a particle size ranging from about 1 to 65 microns, and tobacco flavoring incorporated in said spheres, said spheres having a uniform diameter ranging from about 0.1 to 8 mm.

References Cited

UNITED STATES PATENTS

| 2,768,913 | 10/1956 | Hiler | 131—265 X |
| 3,110,315 | 11/1963 | Lendvai | 131—200 X |

SAMUEL KOREN, *Primary Examiner.*

D. J. DONOHUE, *Assistant Examiner.*